United States Patent [19]
Sabee

[11] 3,840,418
[45] Oct. 8, 1974

[54] METHOD OF MANUFACTURE OF A SANITARY ARTICLE AND PLY HAVING SELECTIVELY THICKENED AREAS

[76] Inventor: Reinhardt N. Sabee, 728 S. Summit St., Appleton, Wis.

[22] Filed: Mar. 3, 1972

[21] Appl. No.: 231,725

Related U.S. Application Data

[62] Division of Ser. No. 17,714, March 9, 1970, abandoned.

[52] U.S. Cl. ............... 156/244, 128/287, 156/500, 264/167
[51] Int. Cl. ............................................ B29c 11/00
[58] Field of Search ..... 264/167, DIG. 33; 156/244; 128/287; 2/102 A

[56] References Cited
UNITED STATES PATENTS

| | | | |
|---|---|---|---|
| 2,866,256 | 12/1958 | Matlin | 28/32 |
| 3,215,578 | 11/1965 | Craver | 156/244 |
| 3,239,402 | 3/1966 | Ecklund et al | 156/244 X |
| 3,312,766 | 4/1967 | Stevens | 264/167 |
| 3,402,715 | 9/1968 | Liloia et al | 128/287 |
| 3,420,926 | 1/1969 | Mason et al | 264/167 |
| 3,459,625 | 8/1969 | Heller et al | 264/167 X |
| 3,553,073 | 1/1971 | Rausing et al | 156/244 X |

*Primary Examiner*—Edward G. Whitby
*Attorney, Agent, or Firm*—Wheeler, Morsell, House & Fuller

[57] ABSTRACT

A sanitary article includes a ply of extruded synthetic resin which is light in weight and which is given increased pin- or tape-retention strength by a selective extrusion process which thickens the film web of resin selectively at the localized points where strength is needed. In the case of a diaper or bed pad or the like, these may comprise either a band transversely across at least one end of the backing ply, or may comprise one or more thickened areas at certain corners. In the case of a fenestrated sheet or bib, the thickened area may be a bead around an opening.

10 Claims, 17 Drawing Figures

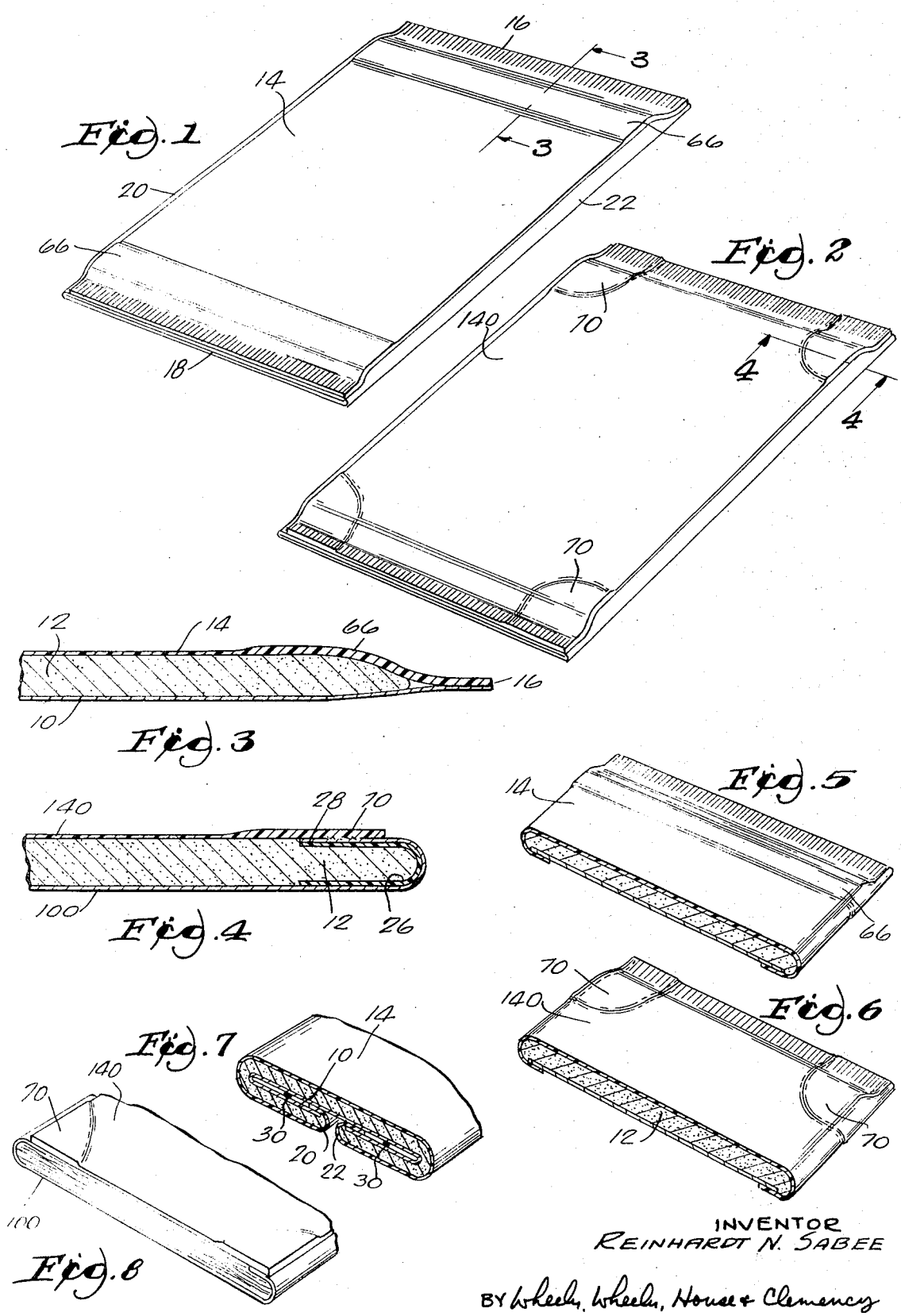

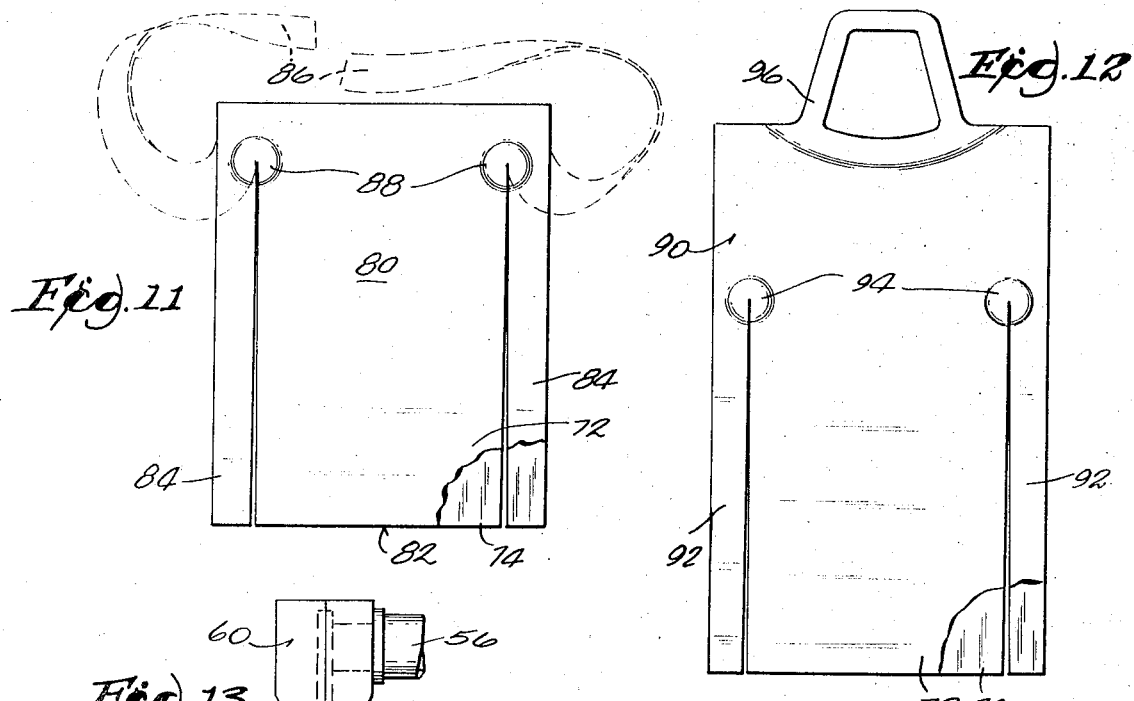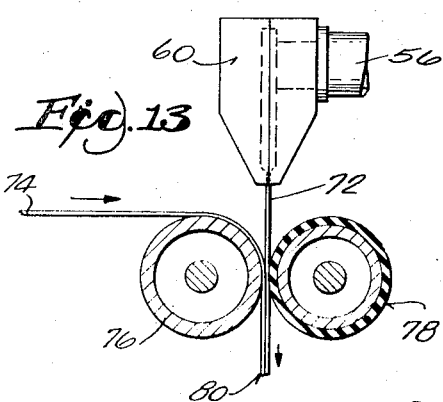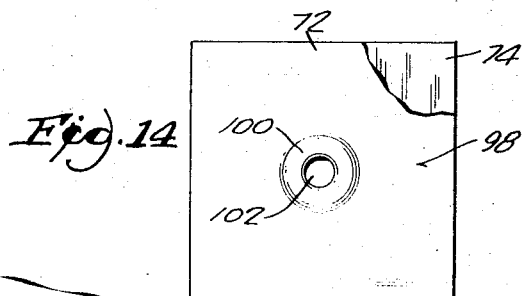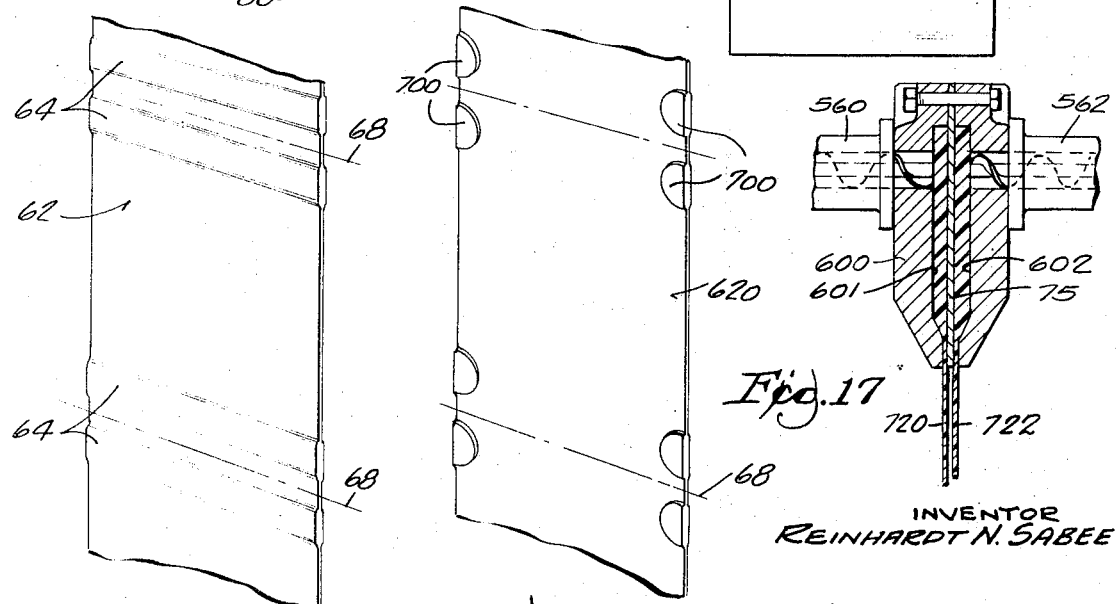

3,840,418

METHOD OF MANUFACTURE OF A SANITARY ARTICLE AND PLY HAVING SELECTIVELY THICKENED AREAS

This is a division of application Ser. No. 17,714 filed Mar. 9, 1970 now abandoned.

BACKGROUND OF INVENTION

The synthetic resin films known as plastics and used in sheets as backing plies for diapers or as materials for aprons, gowns, drapes, bed pads and fenestrated sheets tear quite readily if thin enough to be soft and pliable. Prior art efforts to meet this tearing problem have involved the thickening of the entire sheet to provide the requisite strength. Such a thickened ply loses its softness and flexibility and becomes expensive because of relatively large amounts of resin required.

The present invention is based on the discovery that when a plastic film is extruded, it is readily possible temporarily to increase the flow through the whole slot-die or through given portions of the extrusion nozzle either by momentarily increasing the pressure on the liquid resin or by reducing back pressure, as by enlarging briefly a part or all of the cross sectional area of a slot-die. Thus the increased thickness is localized and the rest of the area of the film is left soft, an increased amount of resin being used only in the areas of stress where it is needed.

SUMMARY OF INVENTION

From the standpoint of the ultimate product, the invention consists of a web or sheet of plastic usable in a sanitary article such as a diaper or the like having a backing sheet which over most of its area is only sufficiently thick to be moisture-proof, and hence retains its desirable softness and flexibility, being integrally reinforced in particular areas by the extrusion of resin at a locally increased rate to produce added thickness only where needed.

From the standpoint of the method involved, the selective increase in thickness of the extruded film of resin is achieved by momentarily and in controllable local areas increasing flow through the nozzle or slot-die. At the point of extrusion, the resinous material is hot and rather thick, having relatively high viscosity and being syrupy in character. Most of the thermoplastic resins commonly recognized as extrudable are appropriate, examples being vinyl, polypropylene, and polyethylene and/or copolymers thereof.

Because of the viscosity of the material at the point of extrusion, a sudden increase in flow may be achieved either by enlarging the opening or increasing the pressure on the resin. The increase may be general, throughout the nozzle, or it may be developed in a localized area. If the accelerated flow is almost instantaneously relieved, the resulting thickening of the web will be sharply delineated and it may be confined to a portion of the nozzle. In other words, the flow increase does not have time to spread through the viscous liquid resin to other portions of the nozzle.

This makes it possible to thicken only such portions of the web of synthetic resin as are to register with the corners or other desired areas of a resinous web. If the flow is increased throughout the width of the nozzle, a band of increased thickness will be developed clear across the resulting extruded web.

There are several ways which I have developed for locally increasing flow. These include:

1. An increase in the rate of rotation of the feed screw which is delivering the hot resin to the nozzle. The increase will normally be abrupt and temporary.

2. The delivery of the hot resin to the nozzle by means of a plurality of laterally spaced screws, the abrupt acceleration of the feed screws at opposite sides of the nozzle causing a localized acceleration of flow of extruded material to selected areas of the resulting web.

3. A bodily and temporary opening of the nozzle or slot-die by deformation of at least one portion thereof either locally or throughout the nozzle width.

There are others but the foregoing will illustrate the generic method for localized thickening of the plastic film by selective increase of flow. As hereinafter shown, the invention also contemplates laminating the plastic film, thickened wherever desired, to a web of woven or non-woven fabric or paper or other materials.

BRIEF DESCRIPTION OF DRAWINGS

FIG. 1 is an inverted perspective view of a diaper embodying the invention.

FIG. 2 is an inverted perspective view of a modified embodiment of a diaper embodying the invention.

FIG. 3 is a fragmentary detail view taken in section on the line 3—3 of FIG. 1.

FIG. 4 is a fragmentary detail view taken in section on the line 4—4 of FIG. 2.

FIG. 5 is a fragmentary detail perspective view of a modified construction.

FIG. 6 is a fragmentary perspective view of a further modified construction.

FIG. 7 is a fragmentary perspective view in cross section showing the manner in which the diapers are desirably folded in completion for use.

FIG. 8 is a fragmentary perspective view in cross section showing a modified embodiment of the invention in which layers of tissue are used instead of pulp or fluff to make the absorbent pad.

FIG. 11 is a front elevational view of a waist type apron made in accordance with the invention.

FIG. 12 is a front elevational view of a bib type apron made in accordance with the invention.

FIG. 13 is a diagrammatic side elevational view showing the making of a laminate including a plastic web.

FIG. 14 is a plan view of a fenestrated towel or sheet made by the procedures herein described.

FIG. 15 is a fragmentary perspective view of a web having somewhat spaced transversely extending reinforced areas between which the web is to be severed.

FIG. 16 is a view similar to FIG. 14 showing localized thickened areas at the sides of the web and between which transverse severance takes place.

FIG. 17 is a view somewhat similar to FIG. 13 but showing a plurality of webs extruded from a compound extruding die.

DETAILED DESCRIPTION

Figure 9:
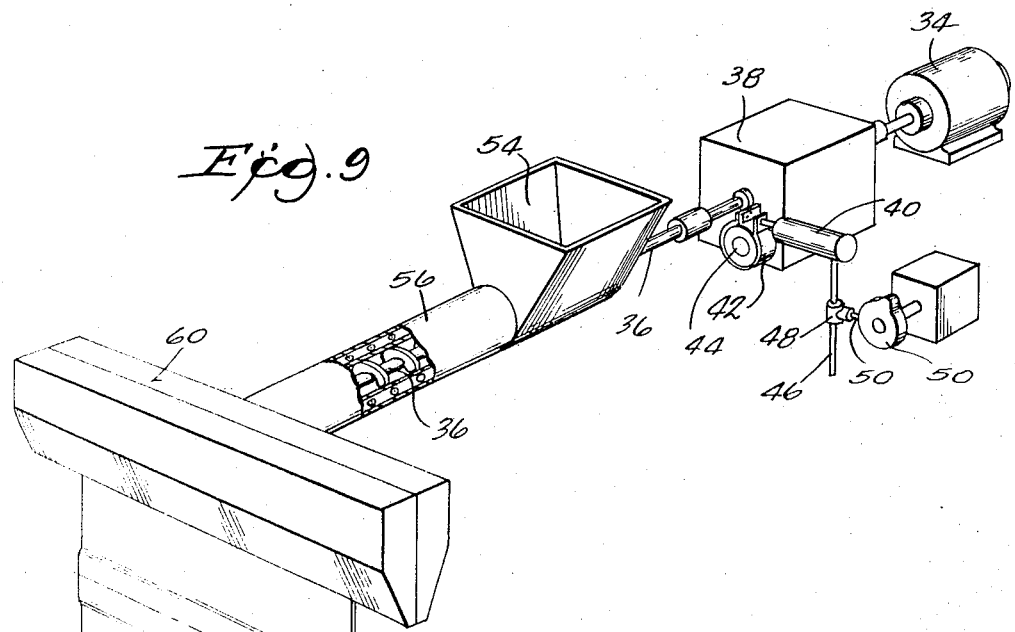
FIG. 9 is a diagrammatic perspective view of extruding apparatus devised for making a plastic web with localized transversely thickened bands as used in the diapers of FIGS. 1, 3 and 5.
Figure 10:
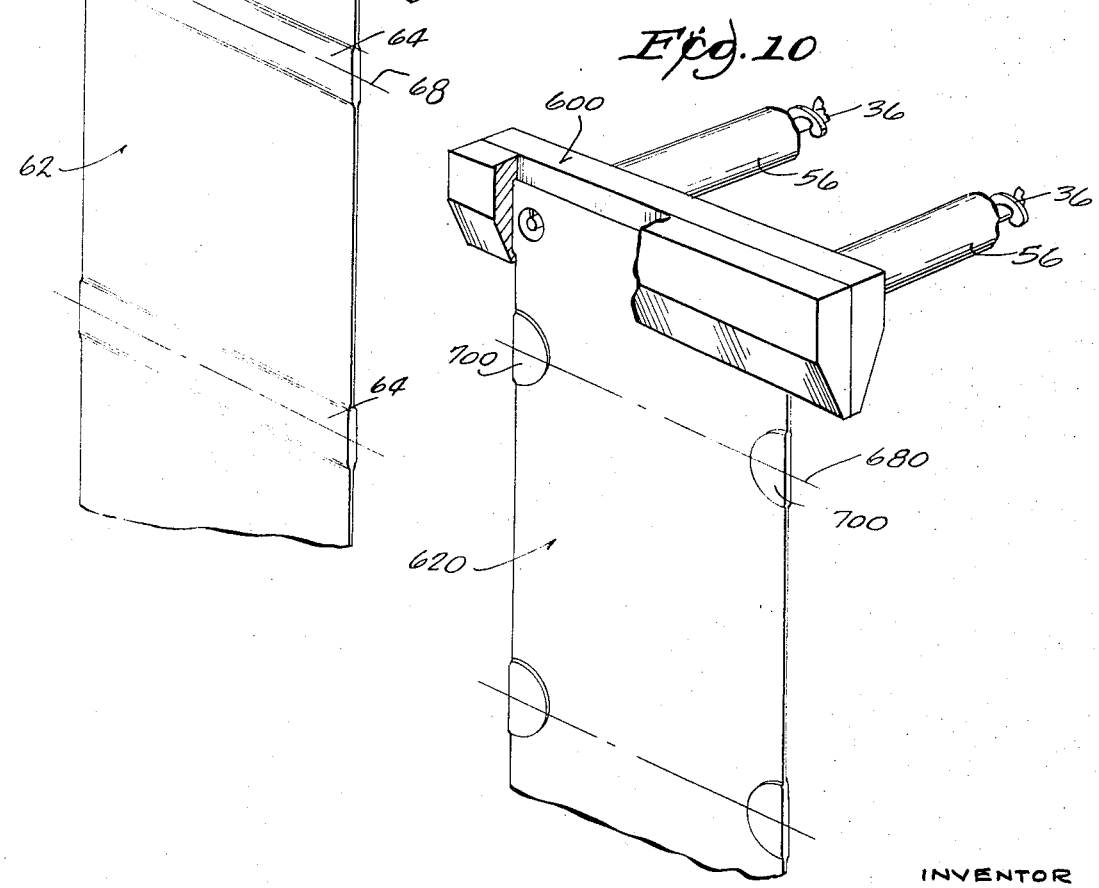
FIG. 10 is a fragmentary diagrammatic view showing an extruding mechanism similar to that of FIG. 9 except that it is used to produce webs having localized laterally spaced thickened areas of the type shown in FIGS. 2, 4 and 6.

Aside from the invention herein disclosed, the articles selected for exemplification in the drawings may be of previously known constructions. The diaper shown in FIGS. 1, 3 and 5 comprises a top ply 10 (it is underneath in the inverted views but on top when in use) which is of tissue or non-woven fabric and is porous to admit fluids into the filler pad 12. In order to confine the fluid to the filler pad, the backing ply 14 is desirably a sheet of waterproof synthetic resin. In use, it underlies the rest of the diaper. At its ends 16 and 18 and along its side margins 20 and 22, the water resistant or waterproof backing ply 14 is marginally adhered to the facing ply 10, either directly or through a side strip. In the exemplification of FIG. 4, the facing ply 100 has a reinforcing strip 26 of synthetic resin along its side margins, the whole side margin 28, thus reinforced, being turned over about the pad 12 and secured to the under surface of the backing ply 140.

It is common to complete diapers of the disclosed types by folding inwardly the side margins 20 and 22 and, at some point intermediate the length of the diaper, using dots of adhesive 30 to connect portions of the inwardly folded flaps to the facing ply 10 as shown in U.S. Pat. No. 3,180,335, and as shown in FIG. 7.

To achieve the advantages of the present invention, the backing plies 14 and 140 are made by extrusion and the resulting web is thickened locally by accelerating the flow of hot resin through the extrusion nozzle, either generally or locally. One way of accomplishing this result is to use a motor 34 for driving a feed screw 36 through a planetary transmission 38 whereby the rate of operation of the feed screw may be accelerated at any time by using a ram 40 to apply a brake 42 to a shaft 44 of the planetary transmission 38. As diagrammatically illustrated, a pressure line 46 leading to ram 40 is provided with a valve 48 having a stem 50 which is periodically actuated by a cam 52 to open the valve 48 briefly and thus momentarily pressure-operating the ram 40 to apply the brake 42 and momentarily to accelerate the operation of feed screw 36. No means of operating the cam 52 is illustrated since this may be done manually or by a timer or by interconnection with the diaper manufacturing machinery.

The heated and viscous synthetic resin is introduced by means of hopper 54 into the conveyor housing 56 leading to the extrusion nozzle 60. From the nozzle 60 issues a continuous web 62 of extruded synthetic resin. This web has selectively thickened areas such as the transverse bands shown at 64, these being produced by an abrupt and temporary increase in flow which, in this particular embodiment, involves acceleration of the feed screw to increase briefly the amount of resin discharged by the nozzle. There are numerous other ways for producing momentary increase in flow either by local increase in pressure or by locally opening the split nozzle.

Since the web is to be severed into sheets for backing ply purposes the arrangement may be such that severance occurs through a transversely thickened band 64 which has twice the width of the thickened bands 66 at the opposite ends of the backing ply 14 shown in FIGS. 1, 3 and 5. Any desired width may be produced by changing the shape of the cam 52 to vary the relative length of time for which the increased flow will occur through the nozzle.

Alternatively, there may be two bands close together and the web may be severed between them as shown in FIG. 6.

A band 66 which extends completely across the diaper as in FIGS. 1, 3 and 5 is particularly intended for use when tape may be extended clear across the diaper to anchor the diaper. When short tapes or diaper pins are to be used, it is preferred that the thickened zones 70 be limited to one or more corners (FIG. 2) or points near the corners of the resulting article as in FIG. 16. If desired, the apparatus used for this purpose may be essentially identical with that shown in FIG. 8 except that the feed screws 36 and housing 56 are duplicated and led into the nozzle 600 adjacent the opposite ends of its extrusion slot as shown in FIG. 9. When a momentary increase in flow occurs in the resin fed in viscous form into the nozzle 600, the resin will increase the thickness of the extrusion locally, it being more easily discharged from the nozzle than spread transversely therein. The result is to produce a web 620 with localized and laterally spaced thickened areas 700.

As above noted, there are several ways which are mechanically different and in which pressure or flow variations may be employed for a temporary increase in flow either in localized areas or across the nozzle to produce selectively the integral locally thickened webs herein contemplated.

As a result of this construction, those portions of the backing strip which contact the body of the person to whom the diaper is applied will be relatively very thin and flexible. Yet those portions of the backing strip which are required to receive the stress of the diaper pin or tape will be made sufficiently heavy to sustain this stress without tearing.

Although the invention has heretofore been exemplified by showing locally thickened webs applied to various diapers, the articles in which the invention is usable are by no means limited to diapers. Neither is the invention limited to a single film. Two or three or more webs having the same or different characteristics may be laminated to each other, if desired. FIG. 13 suggests that just after the plastic web emerges from the extruding slot-die 72 it may be laminated to a web 74 which may be extruded in the same manner as above described, or may be paper or fabric or non-woven fabric, or another prefabricated plastic. It is even possible to extrude plural films from a compound extruding die which may be mechanically unitary as shown in FIG. 17. The die 600 there diagrammatically illustrated, has internal chambers 601 and 602 respectively supplied with extrudable material through separate inlet pipes 560 and 562. A dividing plate or plates 75 may be used as a partition between the chambers 601 and 602. The issuing films 720 and 722 may be alike or different in material and one or both may have the locally thickened areas above described. If laminated immediately following extrusion, they will tend to adhere on contact. However, whether the arrangement shown in FIG. 13 or that shown in FIG. 17 is used, and regardless of how many webs are to be laminated, the webs may be brought together in the bight of rolls 76 and 78. Normally, the roll 76 would be a warm roll and the roll 78 a chilled roll with a soft jacket to accommodate the locally thickened portions of web 72. The compounded web 80 or laminate may be used wherever desired.

Examples of such use are shown in FIGS. 7, 12 and 14. FIG. 11 shows a waist apron 82 which has integral strips 84 partially severed from the sides of the web 80 to serve as ties to be fastened about the wearer's waist as indicated by the dotted lines 86. In order that the apron may be soft and pliable throughout most of its area while, at the same time, avoiding tearing between the ties and the rest of the apron, the areas 88 at the juncture of the ties to the rest of the apron are thickened by momentary local increase in flow of the resin as it leaves the extruding die, such localized increase being effected by any of the procedures above noted.

FIG. 12 shows a bib apron 90 with similar ties at 92 and locally thickened at protective areas 94. This apron also has a thickened loop portion 96 through which the wearer's head passes for the support of the apron.

Similarly, the fenestrated towel 98 shown in FIG. 14 has a locally thickened zone 100 about the fenestration opening 102 to avoid tearing, while leaving the major part of the towel or sheet 98 soft and pliable.

In the accompanying claims, the word "plastic" is used in accordance with the ordinary parlance to refer to a synthetic resin which, for the purposes of the present invention, will be understood to be extrudable.

I claim:

1. A method of manufacturing a plastic web with at least one selected portion locally thick as compared with other portions of the web, said method including forcing viscous plastic material through an extruding nozzle in the form of a web of substantial width accelerating the flow of said extruded plastic material for a limited space of time through said nozzle by increasing the pressure on the plastic material to form said locally thick portion of the web.

2. A method according to claim 1 in which the said extruded material in the form of a web is laminated to another web.

3. A method according to claim 2 in which other web is also an extruded web.

4. A method according to claim 1 in which the acceleration of flow of material in the course of extrusion thereof is limited to an area of less width than the web.

5. A method according to claim 1 in which the increase of pressure on the material in the course of extrusion thereof is momentary to confine the increase in pressure to an area of limited extent laterally of the web, laterally adjacent portions being substantially free of the increase in pressure to provide a locally thick portion only in the area of increased pressure.

6. A method according to claim 1 which includes the step of laminating a second web to the web first mentioned and in immediate proximity to the point at which the extrusion of the first mentioned web is effected.

7. A method according to claim 6 in which said second web is paper.

8. A method according to claim 6 in which the material extruded to form the web is at superatmospheric temperature and the point at which the first and second webs are laminated together is maintained warm at the side of the second web, the first mentioned web being cooled at its opposite side.

9. A method according to claim 6 in which the second web is a fabric.

10. A method of manufacturing a diaper having a backing ply, a facing ply and an intervening pad, said method including making the backing ply by the extrusion of a web of plastic backing ply material by forcing viscous liquid resin through an extruding nozzle and subjecting said material to localized variation in flow by increasing the pressure on said liquid resin for a brief interval during which the thickness of the web of extruded material is selectively increased to produce thickened portions in a zone of limited width less than that of the web with said thickened portions forming portions of the side margins and end margins of the diaper which extend inwardly from the ends and side edges of the web, the several plies thereafter being assembled upon the pad and the thickened portions of the backing ply providing reinforcement of points at which the diaper is supported.

\* \* \* \* \*